(12) United States Patent
Loucks et al.

(10) Patent No.: US 7,873,548 B2
(45) Date of Patent: Jan. 18, 2011

(54) METHOD AND SYSTEM OF PLACING AN ORDER FOR A CUSTOM STAMP USING AN IDENTIFIER

(75) Inventors: Robert J. Loucks, Fergus (CA); Christopher C. Court, Guelph (CA); Michael A. Gazzola, Kitchener (CA)

(73) Assignee: 2062532 Ontario Inc. (CA)

( * ) Notice: Subject to any disclaimer, the term of this patent is extended or adjusted under 35 U.S.C. 154(b) by 1082 days.

(21) Appl. No.: 11/315,496

(22) Filed: Dec. 23, 2005

(65) Prior Publication Data

US 2007/0150422 A1    Jun. 28, 2007

(51) Int. Cl.
G06Q 30/00 (2006.01)
(52) U.S. Cl. .............. 705/26.5; 705/27.2; 705/26.1
(58) Field of Classification Search .......... 705/26, 705/27
See application file for complete search history.

(56) References Cited

U.S. PATENT DOCUMENTS 7,216,092 B1 * 5/2007 Weber et al. ............ 705/26
2002/0040333 A1 * 4/2002 Fuwa ................... 705/27

OTHER PUBLICATIONS

SOSET, Jul. 2003 http://web.archive.org/web/20030727040538/www.namosoft.nl/.*

SOSET, Jul. 2003 http://web.archive.org/web/20030727040538/www.namosoft.nl/.*

* cited by examiner

Primary Examiner—Yogesh C Garg
Assistant Examiner—Matthew Zimmerman
(74) Attorney, Agent, or Firm—Katten Muchin Rosenman LLP

(57) ABSTRACT

A method of placing an order for a custom stamp, including purchasing a standard stamp mount where each stamp mount has associated with it a separate discreet identifier. Under control of a client system, information for ordering the custom stamp is displayed and a request to order the custom stamp is sent using the separate discreet identifier to a server system. Under control of the server system, the request is received and additional information previously stored and identified by the identifier is retrieved. Under control of the client system, a custom impression is designed and previewed. Under control of an ordering component of the server system, the request is received and identifying information to identify a purchaser is requested. An order to produce the custom impression for the purchaser is generated. Under control of a manufacturing component of the server system, the generated order to complete the purchase of the custom impression is fulfilled, and the custom impression is mailed to the purchaser.

12 Claims, 4 Drawing Sheets

METHOD AND SYSTEM OF PLACING AN ORDER FOR A CUSTOM STAMP USING AN IDENTIFIER

FIELD OF THE INVENTION

This invention relates in general to a method of placing an order over the Internet and more particularly to a method and system of placing an order for a custom stamp over the Internet.

BACKGROUND OF THE INVENTION

In general the purpose of a stamp is to create a repeatable ink impression on a surface which is usually, but not necessarily, paper. Traditional stamps can be created using a variety of technologies such as poured polymer, flash and laser engraved rubber. Specifically these processes are used to make an engraved surface or a die, which can then transmit ink. Once the die is created, it is affixed to a mount which the user of the stamp grasps during the stamping process.

In general there are two distinct categories of stamps. The first category is a standard or stock stamp, which produce generic phrases or impressions such as "paid", "posted", or "received". The second category of stamp is the custom stamp that is individually designed and can include custom phrases or impressions such as a name, address, logo or graphic. In the past small local stationers relied upon local print shops and rubber stamp manufacturers (RSM's) to service their rubber stamp needs for both categories. As a result of the close proximity to their customers, freight and shipping costs were of little consequence to the small RSM's.

With the advent of national chain stores or office product distributors (OPD's), manufacturing of the "mount" portion of the stamp was consolidated down to a handful of large manufacturers worldwide. As a result, these large manufacturers have been able to produce finished stock stamps, specifically the mount and the die, in standard retail packaging much more economically than the smaller RSM. The production of custom stamps however was neither technically practical, nor economical for the large mount manufacturers to produce and distribute across wide geographic markets. Therefore these manufacturers shipped finished stock stamps to the OPD's and blank mounts to the smaller RSM's. It has been the responsibility of the RSM's to create the customized die to affix to the purchased mount producing a finished custom stamp.

Rubber stamps form a small but necessary product category in an OPD. As such there would be additional benefit, if the OPD could deal with one stamp manufacturer who can supply both stock and custom product as opposed to a single centralized stock stamp supplier and multiple RSM's that fill local custom stamp purchase orders. By consolidating both categories of stamps, volume discounts, simplification of purchasing, inventory control and administration functions would result.

Centralized custom stamp production however is problematic in that there is high single unit shipping cost relative to the unit value of the product. Furthermore the number of people involved in communicating the custom stamp requirements to the manufacturing floor is both very costly and prone to human error. As such it has been impractical to consolidate the local RSM's and has specifically prevented the large mount manufacturers from eliminating them altogether.

Prior art custom stamping systems have tried to address some of the aforenoted problems. For example, the traditional method of ordering a custom stamp involved having a consumer visit an office product distributor who completes an order form with the help of a customer service individual. The order form was then faxed or emailed to an RSM. The RSM would verify the data received and then enters order into the system. More specifically the order is type-set, which is then proof read for accuracy. Once proof read the layout is processed and manufactured through one of the various die-making technologies outlined above. The die is then assembled to a mount and the finished product is shipped to office product distributor who contacts the client for pick-up of the finished product. As outlined above this method involves many different individuals, which leaves the opportunity for human error at several points in the process.

Another method is to order the custom stamp online, which allows the consumer to place the order "on-line" using electronic data interchange (EDI) and/or Internet technology. This method replaces the fax or email and eliminates the RSM order entry step found in the traditional method as well as some accounting interface steps. The remainder of the online method however is essentially the same as the traditional method.

Recent innovations in custom stamp ordering allows the OPD customer service representative to receive the order online from the consumer and then order the custom stamps on-line, by creating a template readable by software. However the OPD representative must still create the layout as per the consumer's specifications. The layout can then be transmitted electronically to the manufacturing floor and accounting systems. Once the die is assembled to the mount, it is then shipped to the OPD. This method results in cost savings resulting from centralized production and the elimination of the manufacturer's order entry processes, however these saving are offset by additional shipping costs when shipping the mount and die to the OPD.

Another method focuses on a voucher based system that relies upon a voucher or order form having a unique serial number that is included with the purchase of a standard mount. The consumer completes the order form and mails, faxes, or emails it to the manufacturer. The manufacturer then enters, typesets and proofreads the order to create the die which is then mailed to the consumer. This method is time efficient for the consumer however the margin for error by the manufacture when completing the order is not circumvented. Specifically the voucher based system therefore continues to rely upon third party interpretation of the consumer request and is still subject to human error.

Thus a method and system of placing an order for a custom stamp over the Internet which combines many advanced technologies into a unique single seamless process, that eliminates the economic and technical barriers to centralized production of custom stamps by making the previously customized finished product a mass produced stock shelf product, and differs significantly from the voucher based system in that the layout is typeset, proof read, and ordered directly by the consumer and bypasses all order entry, typesetting and proofreading steps is desirable.

SUMMARY OF THE INVENTION

An object of one aspect of the present invention is to provide an improved method of placing an order for a custom stamp.

In accordance with one aspect of the present invention there is provided a method of placing an order for a custom stamp, including purchasing a standard stamp mount where each stamp mount has associated with it a separate discreet identifier. Under control of a client system, information for ordering the custom stamp is displayed and a request to order the custom stamp is sent using the separate discreet identifier to a server system. Under control of the server system, the request is received and additional information previously stored and identified by the separate discreet identifier is retrieved. Under control of the client system, a custom impression is designed and previewed. Under control of an ordering component of the server system, the request is received and identifying information to identify a purchaser is requested. An order to produce the custom impression for the purchaser is generated. Under control of a manufacturing component of the server system, the generated order to complete the purchase of the custom impression is fulfilled, and the custom impression is mailed to the purchaser.

Conveniently, the retrieving of additional information previously stored identified by the separate discreet identifier includes retrieving a stamp mount specific template. Preferably the previewing of the custom impression allows for proofing a scaled proof of the custom impression.

In accordance with another aspect of the present invention there is provided a client system for ordering a custom stamp that includes a separate discreet identifier that identifies a stamp mount, a display component for displaying information for ordering the custom stamp a designing component that sends a request to a server system to order a custom stamp impression, the request including the separate discreet identifier so that the server system retrieves additional information previously stored identified by the separate discreet identifier to allow for designing and previewing of the custom impression, and an ordering component that in response to performance of an add-to shopping cart action, sends a request to the server system to add the custom impression to the shopping cart and request identifying information to identify a purchaser.

In accordance with one aspect of the present invention there is provided a server system for generating an order for a custom stamp including a retrieving component for retrieving additional information previously stored and identified by a separate discreet identifier, an ordering component having receiving component for receiving requests and requesting identifying information to identify a purchaser and a placement order component to request the production of a custom impression for the purchaser, a manufacturing component for fulfilling the generated order to complete the purchase of the custom impression, and a mailing component that producing shipping information for the custom impression to the purchaser.

Advantages of the present invention are: eliminates order entry by manufacturer, typesetting, proofreading, and assembly expense at the manufacturing plant, eliminates order entry and customer service expense at the OPD outlet, provides for standardized packaging for the manufacturer, eliminates separate and therefore costly shipping of custom and stock products for manufacturer, allows "custom" products to be shipped through centralized distribution centres by manufacturer, eliminates costly transcription errors caused by misreading of consumer requests by manufacturer, eliminates customized order processing and customer service problems for the retail distributor, provides retail distributor with standardized SKU's and reduces the number of vendors the retail distributor has to use, provides for standardized packaging and reduced shelf space for the retail distributor, increased convenience for the consumer as only one trip to the retail outlet is required, faster turnaround on order completion and delivery, and the consumer gets exactly what was desired and ordered as opposed to an interpretation by someone else.

BRIEF DESCRIPTION OF THE DRAWINGS

A detailed description of the preferred embodiments is provided herein below by way of example only and with reference to the following drawings, in which.

Figure 1:
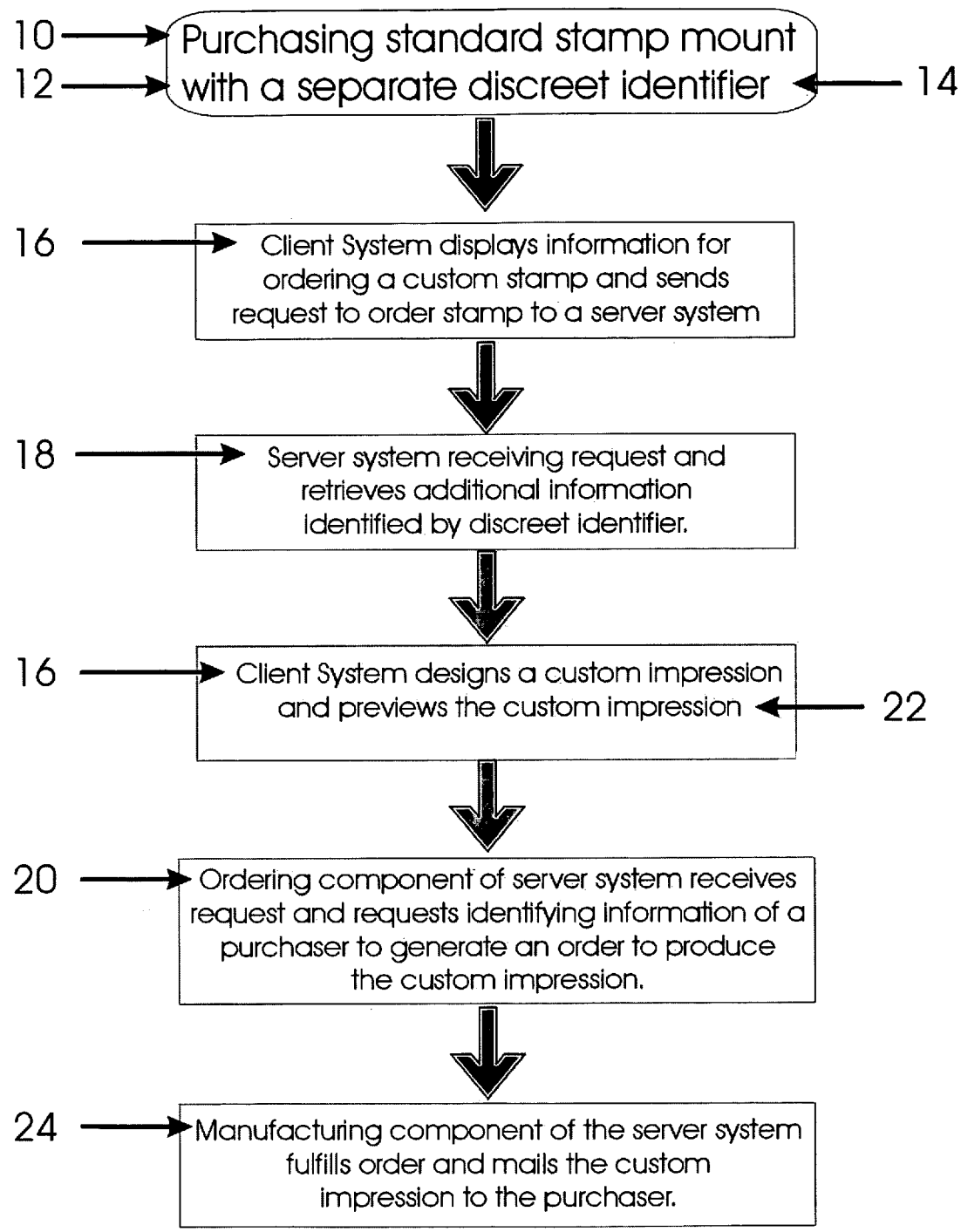
FIG. 1, in a schematic view, illustrates a method of placing an order for a custom stamp in accordance with a preferred embodiment of the present invention.
Figure 2:
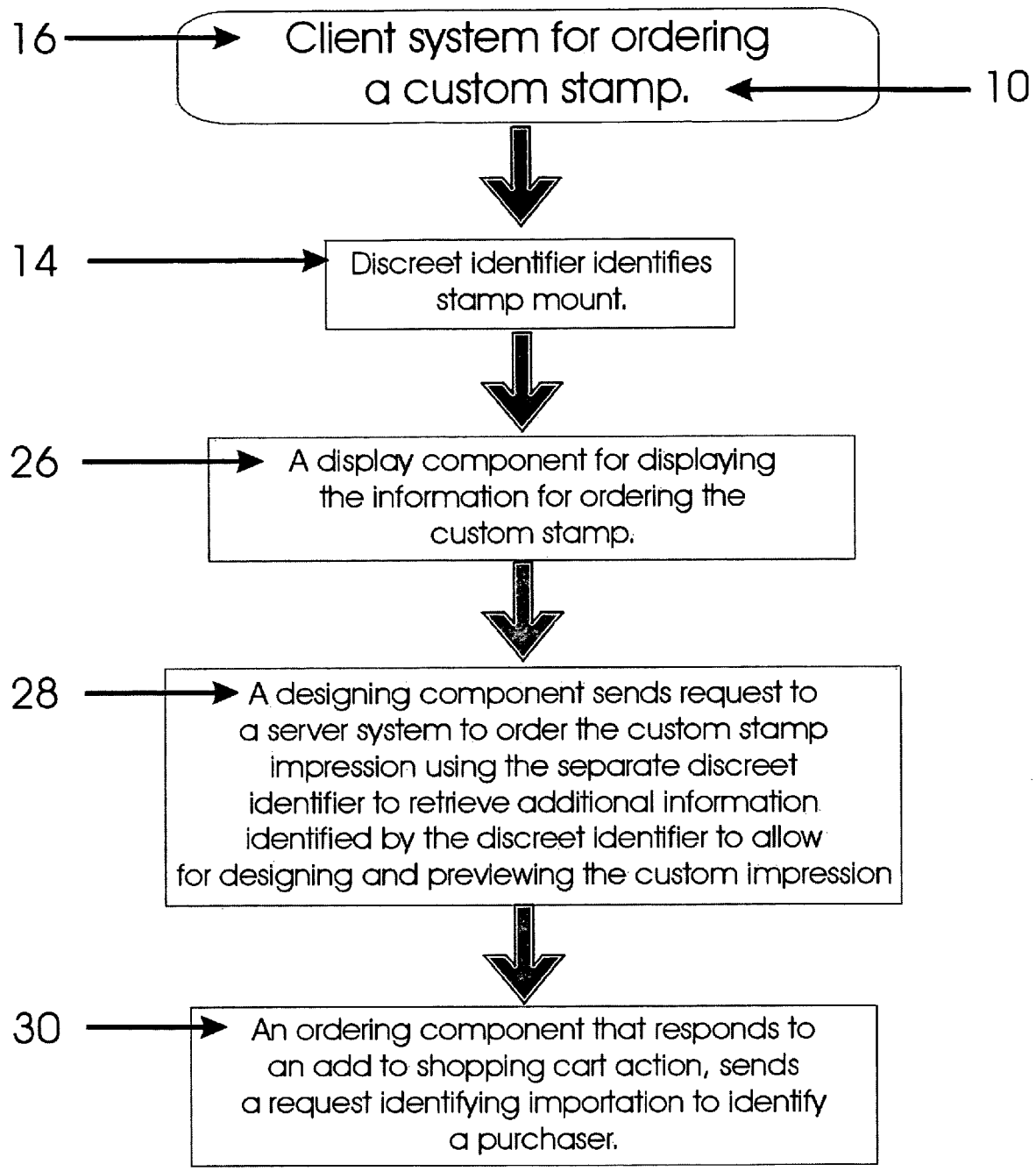
FIG. 2, in a schematic view, illustrates a method of placing an order for a custom stamp in accordance with a preferred embodiment of the present invention.
Figure 3:
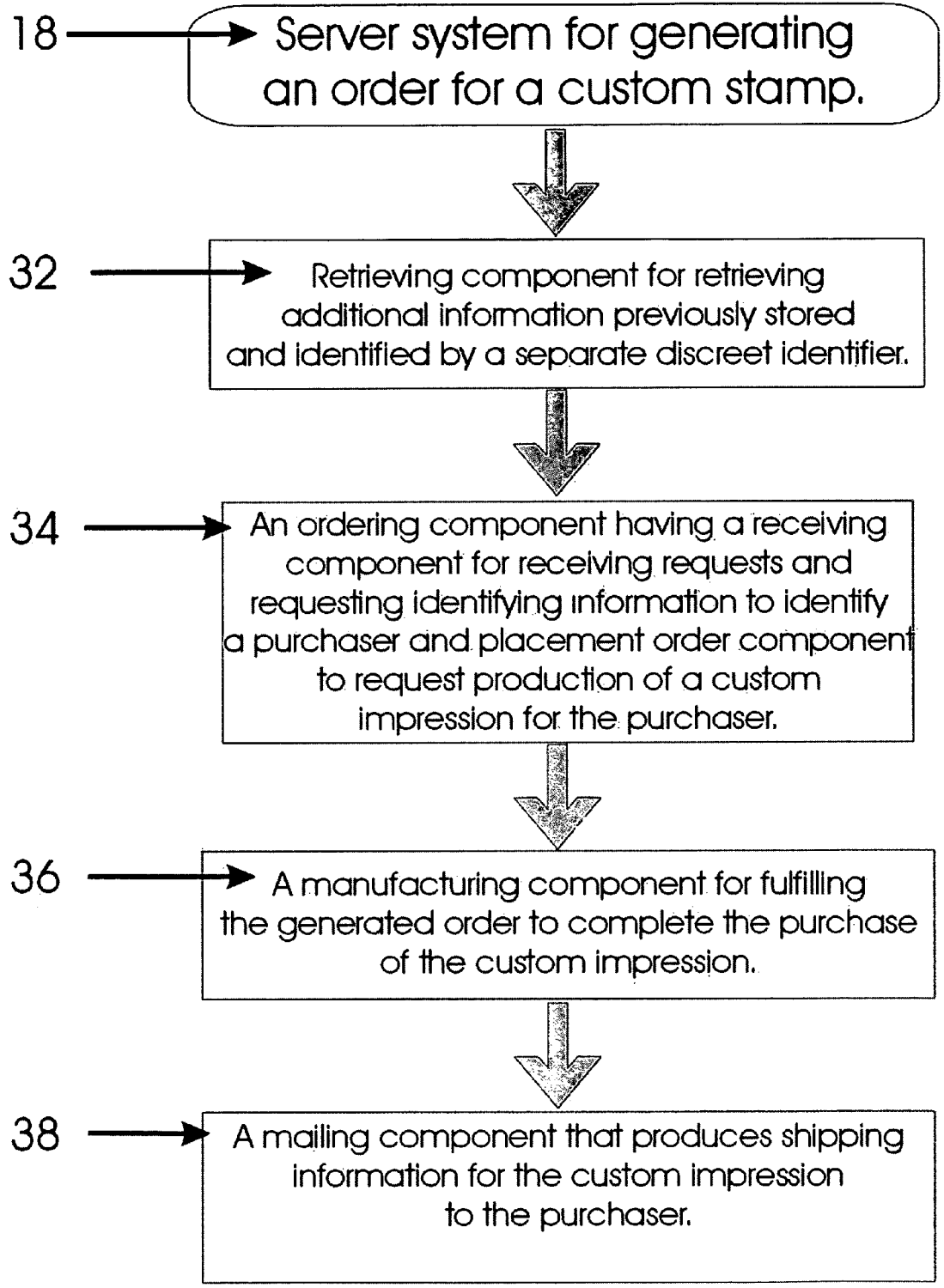
FIG. 3, in a schematic view, illustrates a method of placing an order for a custom stamp in accordance with a preferred embodiment of the present invention.
Figure 4:
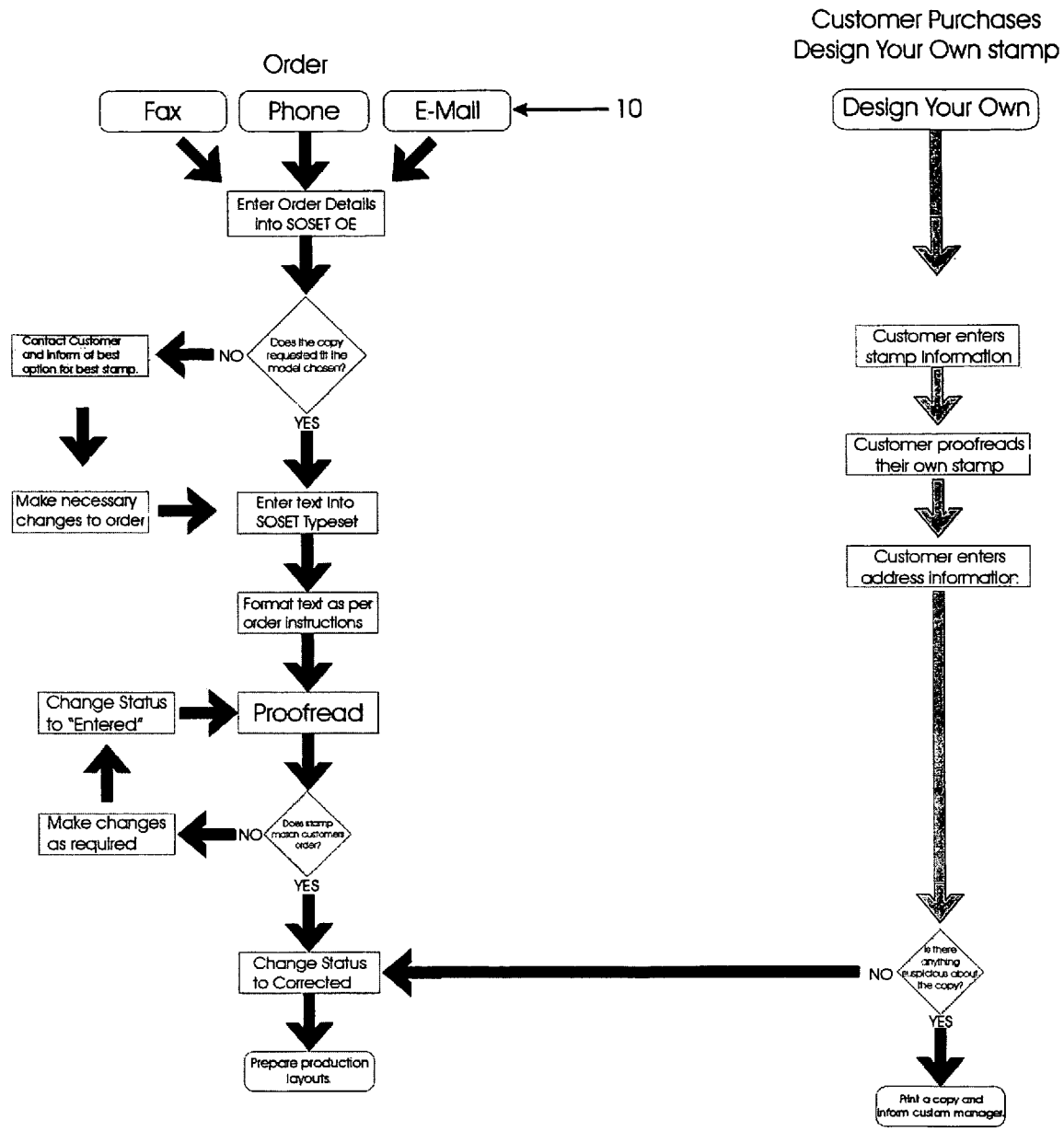
FIG. 4, in a schematic view, illustrates a method of placing an order for a custom stamp in accordance with a preferred embodiment of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

In accordance with a preferred embodiment of the present invention, there is provided a method of placing an order for a custom stamp 10, including purchasing a standard stamp mount 12 where each stamp mount has associated with it a separate and discreet identifier 14. Under control of a client system 16, information for ordering the custom stamp 10 is displayed and a request to order the custom stamp 10 is sent using the discreet identifier 14 to a server system 18.

Under control of the server system 18, the request is received and additional information previously stored and identified by the separate discrete identifier 14 is retrieved. Under control of the client system 16, a custom impression 22 is designed and previewed.

Under control of an ordering component 20 of the server system 18, the request is received and identifying information to identify a purchaser is requested. An order to produce the custom impression 22 for the purchaser is generated. Under control of a manufacturing component 24 of the server system 18, the generated order to complete the purchase of the custom impression 22 is fulfilled, and the custom impression 22 is mailed to the purchaser.

Another aspect of the present invention provides for a client system 16 for ordering a custom stamp 10 that includes a discreet identifier 14 that identifies a stamp mount, and a display component 26 for displaying information for ordering the custom stamp and a designing component 28 that sends a request to a server system 18 to order a custom stamp impression 22. More specifically the display component 26 may be a browser. The request includes the discreet identifier 14 so that the server system 18 retrieves additional information previously stored identified by the identifier 14 to allow for designing and previewing of the custom impression 22. The additional information previously stored and identified by the discreet identifier 14 is a stamp mount specific template. The designing component provides for a selection of fonts and formats to allow the purchaser to custom design the impression as well as providing an exact replica of the custom impression prior to ordering. An ordering component 30 that in response to performance of an add-to shopping cart action, sends a request to the server system to add the custom impression to the shopping cart and requests identifying information to identify a purchaser.

Another aspect of the present invention provides for a server system 18 for generating an order for a custom stamp including a retrieving component 32 for retrieving additional information previously stored and identified by a identifier, an ordering component 34 having receiving component for receiving requests and requesting identifying information to identify a purchaser and a placement order component to request the production of a custom impression for the purchaser, a manufacturing component 36 for fulfilling the generated order to complete the purchase of the custom impression, and a mailing component 38 that producing shipping information for the custom impression to the purchaser.

More specifically standard stamp mounts without the custom impressions or dies are packaged with a separate and discreet identifier namely a sheet or instruction sheet containing a unique and discreet identifier, for example a UPC bar code. The standard stamp mount with the separate sheet having the discreet identifier is then shipped to the OPD. A standard stamp mount therefore allows for standardized packaging for the manufacturer which also results in reduced shelf space for the retail distributor. Standard stamp mounts can come is a variety of sizes.

Once at the OPD the consumer can purchase the standard stamp mount with discreet identifier also known as a design your own stock product. The enclosed instruction sheet with the discreet identifier directs the consumer to go on-line to a website to create their own design. Using the discreet identifier as a password, the consumer logs onto the website and a stamp mount specific template is generated based upon the discreet identifier entered. More specifically the discreet identifier retrieves information previously stored on a server system. This information provides for the generation of the stamp mount specific template for consumer. The type of stamp mount specific template retrieved is based on the discreet identifier.

Specifically as there can be different sizes of standard mounts, there can be different sized impressions or dies. In creating a design for the impression or die it is imperative to consider the size of the surface for designing the impression so that the design fits within the parameters of the impression surface. The discreet identifier retrieves the appropriate stamp mount specific template thereby allowing the consumer to design an impression that will fit accurately on to the stamp mount. The discreet identifier can be an alphanumerically identifier that serves as a proof of purchase, a product type identifier, and as an authorization to design and order a customized product through a website.

Once the stamp mount specific template is retrieved and displayed for the consumer, the consumer can then begin to design their own stamp. The information retrieved by the discreet identifier not only provides the appropriate size of impression, but also retrieves various fonts and formats that are available for that specific size of impression.

Once the consumer has designed their custom impression, the consumer can print a scaled "proof" to confirm that the desired impression has been created. Specifically the custom impression is viewed as a scaled proof so that the consumer can see exactly what the custom impression will look like. Upon viewing the proof, the consumer has the option of either accept the design or make changes and preview the proof again until the desired design for the impression is obtained. Once satisfied with the design for the impression, the order is submitted to the server system.

Upon submitting the order, the consumer is then prompted to provide identifying information to identify the consumer so that the impression or die can be accurately shipped. The information requested can include identifying him/herself by name, email address and shipping address. This information can also be captured for marketing analysis.

An email order confirmation is produced by the server system and is sent back to the consumer. The order is then electronically queued into production all without requiring any human intervention at the manufacturer. The manufacturer can then electronically manufacture the impression or die according to the specifications created and approved by the consumer. Simultaneously shipping instructions are produced so that the impression or die can be accurately sent in by mail in a standard envelope to the consumer. As only the impression or die is being sent to the consumer the shipping costs are drastically reduced as the impression or die can fit into a regular letter envelope and requires minimum postage since the weight of the impression or die is minimal. Upon receipt of the impression or die, the consumer is instructed to "peel & stick" it onto the standard stamp mount originally purchased.

This method is unique in that a consumer or end user is able to design or customize his own finished product using web based technology with a standardized or stock product purchased through retail or catalogue based dealer. Once authorized the consumer can continually manipulate and modify the impression until satisfied with the result, then produce an exact impression on a printer, before submitting an order.

The unique method for ordering a custom stamp eliminates the need for RSM's, and reduces the costs of producing custom stamps so that they are available to those beyond commercial use and can be applied to consumer applications such as personal address stamps, signature stamps, craft supplies, and scrap booking stamps.

The method is applicable to other types of impressions such as name badges, desk signs, door signs and other products. Specifically another aspect of the present invention is for a method of placing an order for a custom impression system including purchasing a separate discreet identifier for the custom impression system and under control of a client system, displaying information for ordering the custom impression system, and sending a request to order the custom impression system using the discreet identifier to a server system. Under control of the server system, the request is received and additional information previously stored identified by the identifier is retrieved.

Under control of the client system again, a custom impression is designed and previewed to ensure that the custom impression is exactly what the purchaser is requesting. Under control of an ordering component of the server system the request is received and identifying information to identify a purchaser is requested. An order to produce the custom impression for the purchaser is then generated and under control of a manufacturing component of the server system the generated order to complete the purchase of the custom impression is fulfilled. Finally the custom impression is mailed by regular mail to the purchaser. The custom impression may be selected from the group consisting of name badges, desk signs, and door signs by way of example only. The custom impression for the custom impression system may be any type of custom communication that the purchaser would like to design on their own and not requiring any intervention from the custom impression system manufacturer.

Other variations and modifications of the invention are possible. All such modifications or variations are believed to be within the sphere and scope of the invention as defined by the claims appended hereto.

We claim:

1. A stamp-ordering apparatus, comprising:
   a standardized packaged product for purchase, wherein the standardized packaged product includes a standard stamp mount and a discreet identifier serving to identify the stamp mount, wherein the standardized packaged product does not include a stamp impression for the standard stamp mount;
   one or more stamp manufacturer servers configured to:
   receive from a customer a custom stamp request, said custom stamp request including the discreet identifier;
   identify a specific template corresponding to the standard stamp mount based on the discreet identifier received from the customer;
   identify a specific size for the stamp impression configured to fit the standard stamp mount;
   identify a plurality of fonts and formats available for the specific size of the stamp impression;
   provide a design component to the customer, wherein the design component is configured to display the specific template and receive one or more selections of the plurality of fonts and formats;
   generate a preview of the stamp impression based upon the received one or more selections of the plurality of fonts and formats;
   generate an order for a custom stamp impression based upon (i) the received one or more selections of the plurality of fonts and formats, (ii) the specific template, and (iii) the identified stamp mount.

2. The apparatus according to claim 1, wherein the one or more stamp manufacturer servers is/are configured to generate the specific template.

3. The apparatus according to claim 1, wherein the one or more stamp manufacturer servers is/are configured to provide for manufacturing of a custom stamp impression corresponding to the custom stamp order.

4. The apparatus according to claim 1, wherein the one or more stamp manufacturer servers is/are configured to provide for shipping to the customer the custom stamp impression corresponding to the custom stamp order.

5. The apparatus according to claim 1, wherein the one or more stamp manufacturer servers is/are configured to, in response to receiving from the customer the one or more selections of the plurality of fonts and formats of the custom stamp, prompting the customer to provide customer-identity and shipping information.

6. The apparatus according to claim 1, wherein the one or more stamp manufacturer servers is/are configured to send to the customer an order confirmation.

7. A method for ordering a custom stamp, comprising:
   purchasing, by a customer, a standardized packaged product, wherein the standardized packaged product includes a standard stamp mount and a discreet identifier serving to identify the stamp mount, wherein the standardized packaged product does not include a stamp impression for the standard stamp mount;
   identifying, by one or more stamp manufacturer servers, a specific template corresponding to the standard stamp mount based on the discreet identifier received from the customer;
   identifying, by one or more stamp manufacturer servers, a specific size for the stamp impression configured to fit the standard stamp mount;
   identifying, by one or more stamp manufacturer servers, a plurality of fonts and formats available for the specific size of the stamp impression;
   providing a design component to the customer, wherein the design component displays the specific template;
   receiving one or more selections of the plurality of fonts and formats from the customer;
   generating a preview of the stamp impression based upon the received one or more selections of the plurality of fonts and formats;
   generating an order for a custom stamp impression based upon (i) the received one or more selections of the plurality of fonts and formats, (ii) the specific template, and (iii) the identified stamp mount 8. The method according to claim 7, wherein the one or more stamp manufacturer servers is/are configured to generate the specific template.

9. The method according to claim 7, further comprising the step of manufacturing a custom stamp impression corresponding to the custom stamp order.

10. The method according to claim 7, further comprising the step of shipping to the customer the custom stamp impression corresponding to the custom stamp order.

11. The method according to claim 7, further comprising the step of prompting the customer to provide customer-identity and shipping information.

12. The method according to claim 7, further comprising the step of sending to the customer an order confirmation.

* * * * *